United States Patent
Murphy et al.

(10) Patent No.: US 11,818,332 B2
(45) Date of Patent: Nov. 14, 2023

(54) USING MULTIPLE TARGET DISTANCES TO DETERMINE LONG-TERM QUALITY AND/OR PERFORMANCE OVER A TEMPERATURE RANGE

(71) Applicant: Aptiv Technologies Limited, St. Michael (BB)

(72) Inventors: Morgan D. Murphy, Kokomo, IN (US); Ronald M. Taylor, Greentown, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 17/349,094

(22) Filed: Jun. 16, 2021

(65) Prior Publication Data

US 2022/0408079 A1    Dec. 22, 2022

(51) Int. Cl.
*G06T 7/00*    (2017.01)
*G01M 11/02*    (2006.01)
*H04N 17/00*    (2006.01)

(52) U.S. Cl.
CPC ...... *H04N 17/002* (2013.01); *G01M 11/0292* (2013.01); *G06T 7/97* (2017.01); *G06T 2207/10012* (2013.01); *G06T 2207/10016* (2013.01)

(58) Field of Classification Search
CPC .... H04N 17/002; G01M 11/0292; G06T 7/97; G06T 2207/10012; G06T 2207/10016
See application file for complete search history.

(56) References Cited

U.S. PATENT DOCUMENTS 11,587,257 B1 *  2/2023  Ha ............................ G06T 1/60
2018/0106979 A1 *  4/2018  Chang ................ G02B 13/0045

FOREIGN PATENT DOCUMENTS

CN          106094418 A  *  11/2016  ............. G03B 43/00
JP          2011107235 A  *  6/2011
WO    WO-2009061519 A1  *  5/2009  ......... G02B 13/0035

* cited by examiner

*Primary Examiner* — Catherine T. Rastovski
*Assistant Examiner* — Yossef Korang-Beheshti
(74) *Attorney, Agent, or Firm* — Miller Johnson

(57) ABSTRACT

A camera testing system for determining performance of a camera comprising an imaging sensor and a lens, the system comprising a processing system comprising at least one processor and memory. The processing system may be configured to: control the camera to capture, using the imaging sensor, a first image through the lens of a target disposed at a first distance from the camera; determine a first modulation transfer function (MTF) value from the first image; control the camera to capture, using the imaging sensor, a second image through the lens of the target disposed at a second distance from the camera that is different from the first distance; determine a second MTF value from the second image; and determine performance of the camera based on the first MTF value, the second MTF value and a difference between the first MTF value and the second MTF value.

17 Claims, 8 Drawing Sheets

USING MULTIPLE TARGET DISTANCES TO DETERMINE LONG-TERM QUALITY AND/OR PERFORMANCE OVER A TEMPERATURE RANGE

FIELD OF THE INVENTION

This invention relates to testing imaging systems for applications, such as autonomous vehicle applications, that need imaging systems to provide a certain performance over long term and/or a certain performance at various temperatures. The invention relates generally to testing imaging systems and, more particularly, evaluating imaging systems to determine long term quality and/or performance over a temperature range.

BACKGROUND

Cameras are used in many applications, with each application requiring specific camera parameters and/or image quality. Factors that may be considered in selecting a camera for a specific application may include image resolution, lens quality, frame rate, image sensor, and/or video compression.

One application that has seen an increase in use of cameras is the automotive industry. Vehicles have rear-view cameras to provide a view behind the car when travelling in reverse, cameras on side-view mirrors to provide a view of blind spots, and on windshields to record accidents. In addition, cameras on vehicles are used to support semi-autonomous and autonomous driving. Autonomous vehicles rely on cameras on every side of the car to provide a 360-degree view of the vehicle's surroundings. To provide proper decisions based on analysis of images captured by the cameras, autonomous vehicle's cameras need to capture high quality images at a fast frame rate. In addition, the cameras should provide consistency under many operating conditions of the vehicle and for extended period of time (e.g., specified life of a semi-autonomous and/or autonomous driving system). Before use in Advanced Driver Assistance Systems (ADAS), components of the camera (e.g., sensors and/or lenses) need to pass stringent tests. However, it is not practical to test an imaging system at all possible operating conditions of the system.

SUMMARY

Exemplary embodiments of this disclosure provide systems and methods for testing cameras. Certain example embodiments provide an indication of camera performance with variations in temperature and over long-term using measurements of a target at multiple distances without needing to perform long term camera testing and/or testing at the multiple temperatures.

According to one exemplary embodiment, a camera testing system for determining performance of a camera comprising an imaging sensor and a lens including one or more lens elements, the camera testing system comprising a processing system comprising at least one processor and memory. The processing system may be configured to: control the camera to capture, using the imaging sensor, a first image through the lens of a target disposed at a first distance from the camera; determine a first modulation transfer function (MTF) value from the first image; control the camera to capture, using the imaging sensor, a second image through the lens of the target disposed at a second distance from the camera that is different from the first distance; determine a second MTF value from the second image; and determine performance of the camera based on the first MTF value, the second MTF value and a difference between the first MTF value and the second MTF value.

In another exemplary embodiment, the processing system is further configured to determine a relative MTF shift between the first MTF value and the second MTF value, and the performance of the camera is determined based on the relative MTF shift.

In another exemplary embodiment, the first and second MTF values are determined at an optical axis of the lens.

In another exemplary embodiment, the first and second MTF values are determined at a plurality of locations over a field of view of the lens.

In another exemplary embodiment, MTF values are determined based on an entire field of view of the lens.

In another exemplary embodiment, the camera is controlled to capture the first and second images at a same room temperature.

In another exemplary embodiment, the camera is controlled to capture the first and second images at a first temperature and the performance of the camera at another temperate is determined based on the difference between the first MTF value and the second MTF value.

In another exemplary embodiment, the second distance is 2.5 to 3 times shorter than the first distance.

In another exemplary embodiment, the first distance and/or the second distance are a fractional value of a hyperfocal distance of the camera.

In another exemplary embodiment, the processing system is further configured to: control the camera to capture, using the imaging sensor, a third image through the lens of the target disposed at a third distance from the camera that is different from the first and second distances; determine a third MTF value from the third image; and determine performance of the camera based on the first MTF value, the second MTF value, the third MTF value and a shift in MTF value between the first MTF value, the second MTF value and the third MTF value.

In another exemplary embodiment, the determining performance of the camera includes determining that the camera passes a performance test when the first MTF value is above a first preset value, the second MTF value is above the first preset value, and the difference between the first MTF value and the second MTF value is below a second preset value.

In another exemplary embodiment, the determining performance of the camera includes determining that the camera passes a performance test when the difference between the first MTF value and the second MTF value is below a preset percentage of the first MTF value.

In another exemplary embodiment, the determining performance of the camera includes determining that the camera fails a performance test when the second MTF value increases or decreases from the first MTF value by a preset percentage.

In another exemplary embodiment, the determining performance of the camera includes determining that the camera passes a performance test when the first MTF value is above a first preset value, the second MTF value is above a second preset value lower than the first preset value, and the difference between the first MTF value and the second MTF value is below a preset percentage of the first MTF value.

In another exemplary embodiment, the first distance is an operating distance of the camera for an application for which the camera is being tested.

In another exemplary embodiment, a method for testing performance of a camera comprises: measuring a first modulation transfer function (MTF) value of a camera from a first image including a target disposed a first distance away from the camera; measuring a second MTF value of the camera from a second image including the target disposed a second distance away from the camera; and determining performance of the camera being satisfactory if the first MTF value is above a first preset value, the second MTF value is above a second preset value and a difference between the first MTF value and the second MTF value is less than a third value.

In another exemplary embodiment, the first distance is a nominal effective distance of the camera and the second distance is 2.5 to 3 times shorter than the first distance.

In another exemplary embodiment, the second preset value is lower than the first preset value and the third value is 15% of the first MTF value.

In another exemplary embodiment, a method for testing performance of a camera comprising an imaging sensor and a lens including one or more lens elements, the method comprising: controlling the camera to capture, using the imaging sensor, a first image through the lens of a target disposed at a first distance from the camera; determining a first modulation transfer function (MTF) value from the first image; controlling the camera to capture, using the imaging sensor, a second image through the lens of the target disposed at a second distance from the camera that is different from the first distance; determining a second MTF value from the second image; and determining performance of the camera based on the first MTF value, the second MTF value and a difference between the first MTF value and the second MTF value.

In another exemplary embodiment, the first and second MTF values are determined at an optical axis of the lens and the camera is controlled to capture the first and second images at a same room temperature.

In another exemplary embodiment, the first distance is a nominal effective distance of the camera and the second distance is 2.5 to 3 times shorter than the first distance.

In another exemplary embodiment, the determining performance of the camera includes determining that the camera passes a performance test when the first MTF value is above a first preset value, the second MTF value is above a second preset value lower than the first preset value, and the difference between the first MTF value and the second MTF value is below a third preset value.

In another exemplary embodiment, a computer-readable non-transitory storage medium having stored therein a program to be executed by a computer of a camera testing system for determining performance of a camera comprising an imaging sensor and a lens including one or more lens elements, the program, when executed, causing the computer to control the camera testing system to at least: control the camera to capture, using the imaging sensor, a first image through the lens of a target disposed at a first distance from the camera; determine a first modulation transfer function (MTF) value from the first image; control the camera to capture, using the imaging sensor, a second image through the lens of the target disposed at a second distance from the camera that is different from the first distance; determine a second MTF value from the second image; and determine performance of the camera based on the first MTF value, the second MTF value and a difference between the first MTF value and the second MTF value.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Figure 1:
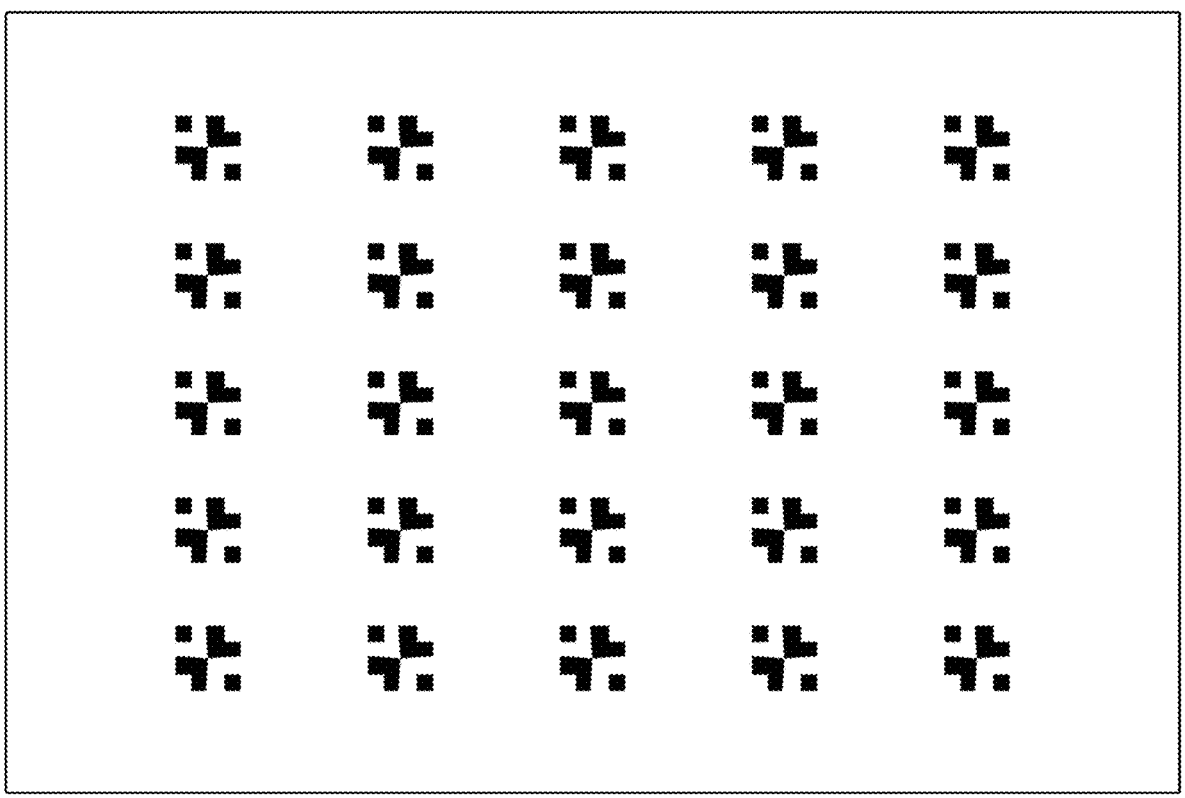
FIG. 1 shows an example pattern that may be used in measuring MTF through an entire image according to an embodiment of the present disclosure.

Certain example embodiments of this application provide solution(s) that improve testing of imaging systems. Certain example embodiments provide an indication of temperature and long-term camera performance of a camera using measurements at multiple distances. Embodiments of this disclosure include using multiple target distance measurements to determine temperature performance and long term quality of the camera. In certain examples, modulation transfer function (MTF) measurements at different target distances are performed and a change in MTF is examined to infer the long-term stability and performance under different temperatures.

The embodiments of this disclosure can determine performance of a camera at different temperatures and/or long term quality of the camera without needing to test the camera at multiple temperatures (e.g., the different temperatures the camera is expected to operate) and/or needing to test the camera for an extended period of time (e.g., expected life of the system). In some examples, camera testing results from testing at a single temperature (e.g., room temperature) and/or from two images of a target captured at two distances can be used to predict how the camera will operate at different temperature and over an extended period of time.

While the disclosure provides examples of determining temperature performance and long term quality of a camera, examples of this disclosure are not so limited and may include predicting quality and/or performance of the camera under other conditions based on MTF measurements at different distances to a target.

Embodiments of this disclosure may reduce the complexity of existing camera testing approaches. The problem(s) of conventional approaches is that the camera needs to be tested at a number of possible operating conditions, which increases costs of the testing and/or is not possible in some situations.

Cameras need to provide certain quality within specified operating parameters and/or conditions of the camera. Light passing through a lens of the camera is captured by the camera's sensor to provide a digital image. The detail that can be captured in the digital image is determined by a number and characteristics of pixels in sensor, lens characteristics and post-processing of the image. The perceived image quality is referred to as sharpness of the image, describing the clarity of detail in the image. The sharpness of an image may determine how well a system can detect and/or identify objects in a captured image.

Modulation transfer function (MTF) is a commonly used quantitative and objective measure for evaluating performance of components of an imaging system. MTF provides accurate and repeatable measurements. In some cases, MTF measurements from individual components (e.g., one or more lenses and/or a sensor) can be combined to provide an overall MTF measurement. When a lens or an imaging system does not satisfy certain MTF thresholds for a specific application, they can be discarded or repurposed for other applications.

An MTF value can range from 0 to 1. An MTF of 1.0 represents perfect contrast preservation, whereas values less than 1.0 mean that more contrast is lost. At MTF of 0 the detail cannot be distinguished due to a diffraction limit of the lens, which is dependent on lens aperture. The MTF of a perfect lens, which is limited only by diffraction, will decrease from 1.0 to 0 as the frequency of distinguishable features (e.g., lines per unit area expressed as LP/mm) is increased. The MTF of actual lenses will decrease faster than a perfect lens as the frequency is decreased, with lower quality lenses decreasing faster than higher quality lenses.

FIG. 1 shows an example pattern that may be used in measuring MTF through an entire image. Vertical and horizontal slanted edges are used to measure MTF because the vertical and horizontal MTF can vary independently of each other optically. Having two edges on each target for each direction allows for multiple measurements for MTF at a particular point. While the discussion is provided with reference to a pattern shown in FIG. 1, examples of the present technology are not so limited and other patterns may be used in determining the MTF.

To evaluate the target at a particular point, a combination of all four edges can be used. One measure of the MTF=min(max(vertical1,vertical2),max(horizontal1,horizontal2)). Other measures of MTF may use the combination of the average of the four edges.

Figure 2:
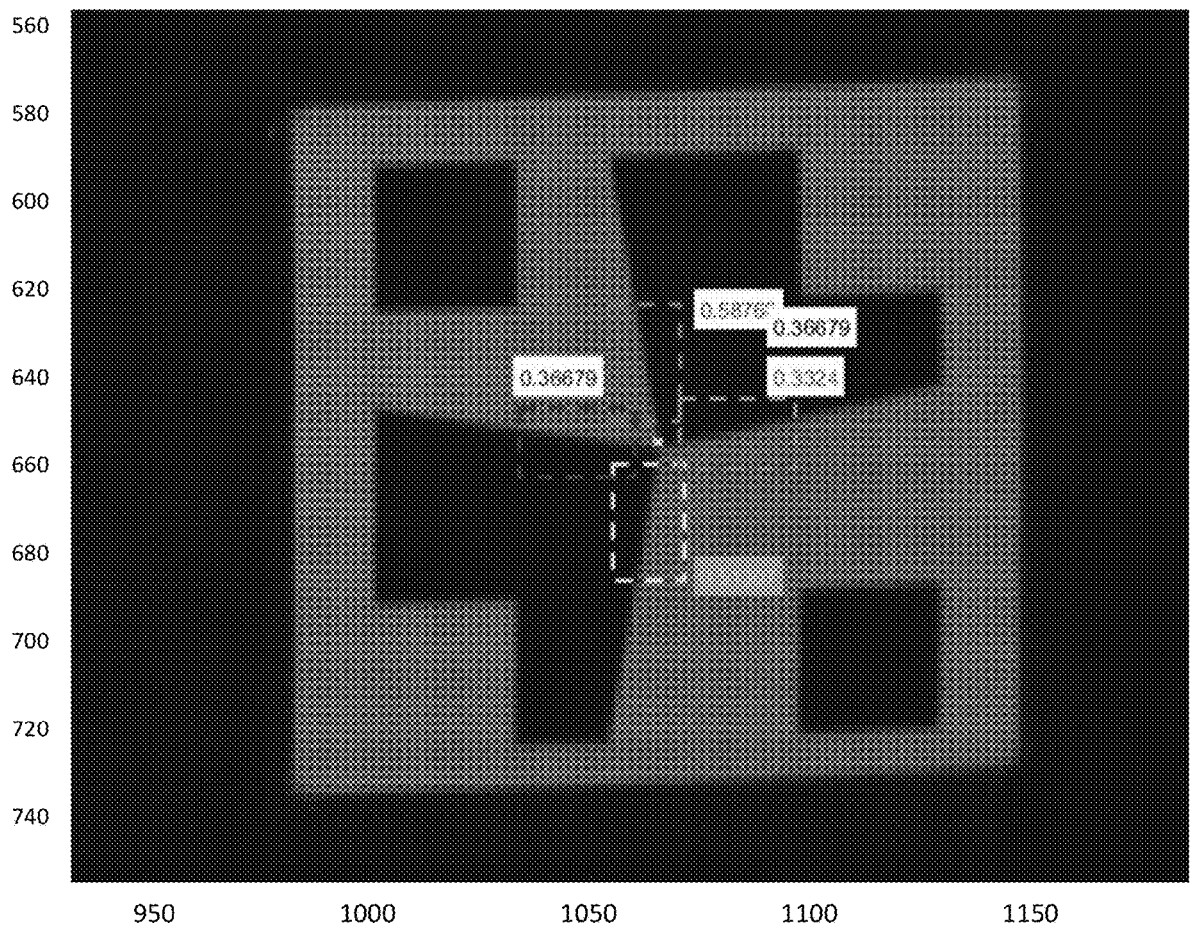
FIG. 2 shows an example image including a standard box size and location output applied to a single target prior to removing red pixels.

FIG. 2 shows an example image including a standard box size or region of interest (ROI) and location output applied to a single target prior to removing red pixels. Within each of the four (4) boxes the image is processed to determine MTF employing the standard ISO12233 algorithm. The processing of the example image with and without red pixels can represent different contrast measures that are used to determine the image quality relative to an image quality requirement.

The image can be processed by software to determine the center of the target, and remove the red pixels in rows or columns according to the alignment of the edge because the red pixels are not represented in the MTF computation. Individual edges are selected by offsetting from the center of the target and then centering the selection box on the edge. The image boxes can be set to a predetermined size, which may be determined by the resolution of the image. In some examples, the image box may be set to 13×17 pixels in size.

Changing the box size and location may result in differences in the MTF computed because of noise factors between the particular set of pixels selected by this method. Red pixel removal (darker dots in the white space shown in FIG. 2) may also change the MTF readings.

In addition to meeting certain MTF requirements, lenses should be able to operate within specifications for MTF over the life of a camera and/or over temperature variation (e.g., from −40° to +85° C.). In certain applications, the MTF specifications are sufficiently high that even cameras that fall below MTF requirements perform their feature functions in field testing.

However, a goal of a provider of cameras and/or systems including the cameras is to exceed customer specifications limits for all cameras in all conditions by the greatest margin possible. Some manufacturing test methodology employ testing at a single temperature (e.g., at Room Temperature), with a single specified distance and utilize manufacturing limits to ensure image quality over the life of the camera. Testing the cameras over the entire range of temperatures is not practical for the manufacturing environment. Typically, only room temperature measurements are employed in a manufacturing environment. The End of Line (EOL) tester may use a several targets to test for MTF across the field of view of the camera; but each target is provided at one specified distance for MTF testing.

For marginal cameras, the MTF measurement at room temperature does not ensure cameras will meet specification at temperature extremes or over the life of the camera. Adding margin to the measurements is not effective because the change in MTF is dependent on a relationship that can follow a steep curve for some cameras; whereas most cameras have a flat relationship. As a result, containment by adding margin to readings would result in unnecessarily scrap.

Figure 3:
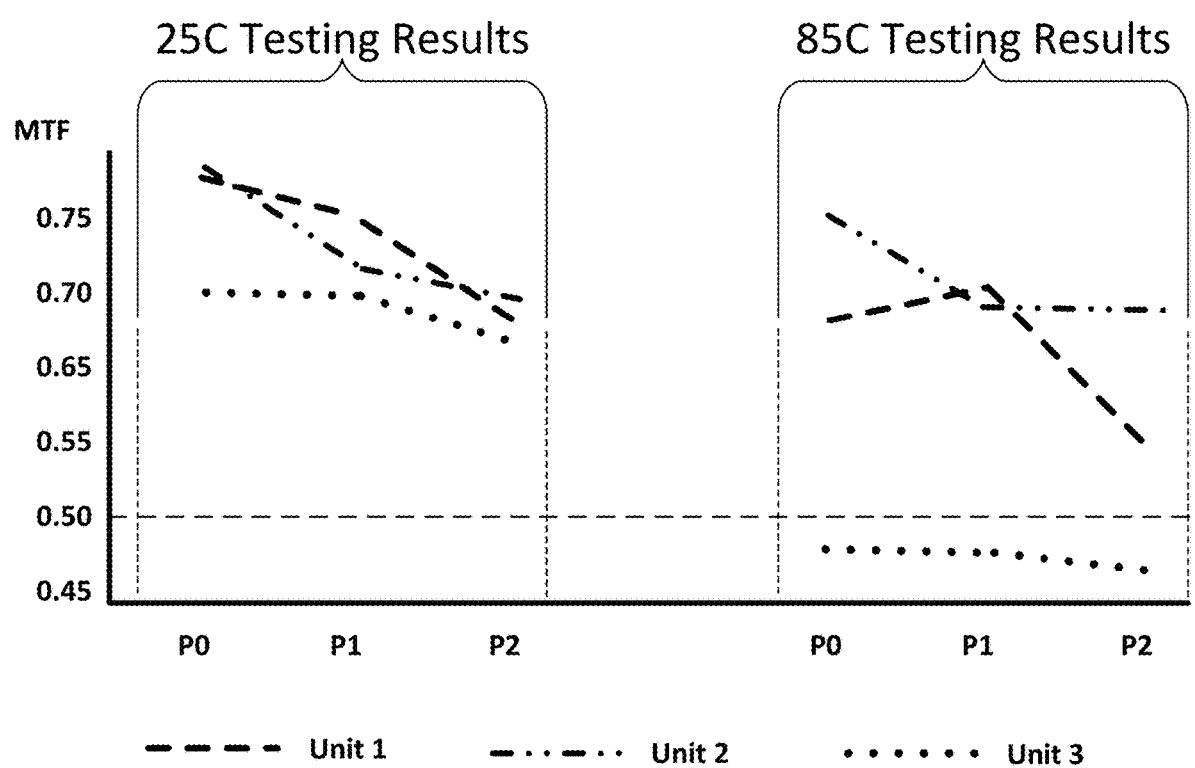
FIG. 3 illustrates performance of three cameras at room temperature (e.g., 25° C.) and at 85° C.

During conventional tests, the shifts in MTF over temperature are not indicated during room temperature testing. However, changes in temperature can affect the MTF results. For example, FIG. 3 shows performance of three cameras (Unit 1, Unit 2 and Unit 3) at Room Temperature (e.g., 25° C.) and at 85° C. FIG. 3 provides measurements at three lens positions relative to a center of the lens (P0, P1 and P2). As can be seen, the output at room temperature does not indicate that the camera 3 will fail at 85° C. While camera 3 is nominally below the other cameras, it exceeds the MTF specification by a wide margin (e.g., above MTF 0.5) and, in some cases, can perform better at room temperature than cameras that exceeded requirements at 85 C. Therefore, a supplemental testing methodology to evaluate camera performance at room temperature and still to ensure camera quality over temperature and the life of the camera is needed.

Conventional intrinsic camera calibration can test cameras at different angles and distances but do not measure MTF and the system does not employ methods described for indication of system performance. Conventional tests do not indicate potential issues with camera that may occur over time or varied environment (e.g., at different temperatures). Moreover, guard banding the system will lead to inappropriately rejecting a significant number of parts that exceed requirements. Current methods, such as guard banding and biasing the build requirements for expected long-term shifts, do not guarantee image quality over the temperature for outlier cameras.

Examples of the present technology overcome the failure of conventional techniques to provide evaluation satisfying requirements of a specific application. For example, conventional techniques do not provide as to whether a camera will provide the required quality after a certain period of time and/or at operating temperatures not tested.

Camera focus capability changes over operating environment of the camera. For example, camera focus capability changes over temperature due to CTE (coefficient of thermal expansion) shifts. At hot temperatures, lens and camera elements expand and back focal length tends to increase. Conversely, at cold temperatures, lens and camera elements contract and back focal length tends to decrease. These focal shifts change the camera performance capability. However conventional testing techniques do not test nor predict how the camera will operate at all expected operating temperatures.

When cameras are measured at different distances, the defocus relationships are very similar to that over temperature (i.e. at closer distances, back focal length is less than ideal and at longer distances, it is greater than ideal compared to the nominal focus distance). Hence, the correlation of focus distance to temperature defocus can be made and used in predicting performance of the camera.

The hyperfocal distance is traditionally defined as the focus distance that yields the largest depth of field (or region of acceptable image contrast) for a camera. If a camera is focused at a distance closer or further from the hyperfocal distance, then the depth of field is decreased for shorter distances (if focused at a longer focus distance) or decreased for longer distances (if focused at a shorter focus distance) compared to the ideal focus distance. By measuring (or sampling the image quality or MTF) at different focus distances compared to the camera nominal focus distance, it is possible to determine a camera's sensitivity to defocus and thus its image quality (as measured by the MTF) over time and temperature.

According to one embodiment, the problems of incomplete evaluation of MTF are solved by measuring MTF at two locations and evaluating the MTF values and the relative shift in MTF between the distances. Based on the relative shift in the MTF values, a determination may be made as to how the camera will operate over time and/or other operating conditions (e.g., temperatures). In some examples, evaluating the change in MTF between the distances is the most critical measure.

According to one embodiment, the process involves measuring the MTF values at a minimum of two different distances (or effective distances when intermediate optics are employed). The nominal effective distance can be specified for the camera design. This distance may be application specific. As an example a distance of the camera can vary from 10 meters to 15 meters, but are not so limited as cameras with longer or shorter distances can be used in some applications.

Figure 4:
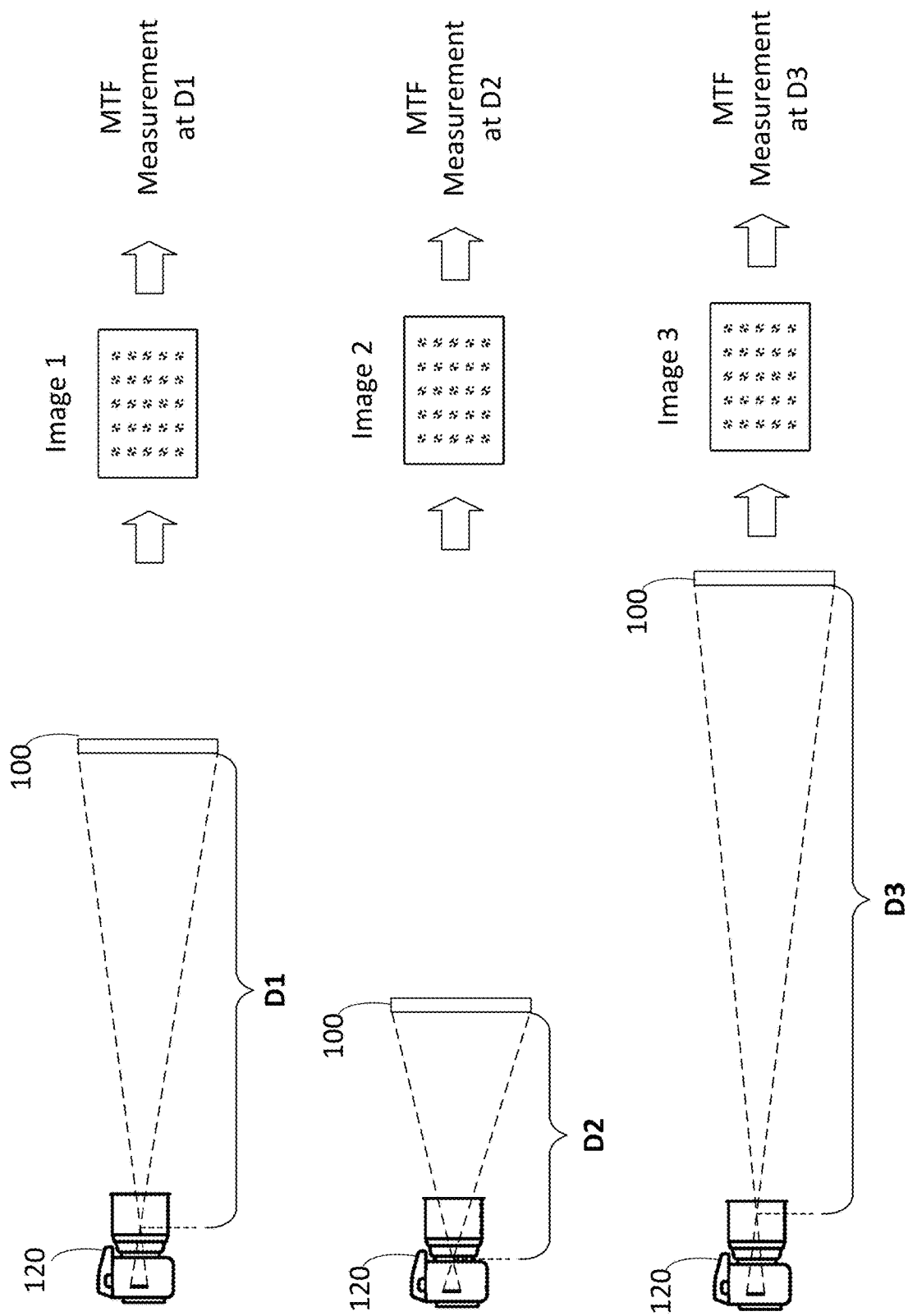
FIG. 4 illustrates an example of images of a target being captured by a camera at different distances according to an embodiment of the present disclosure.

FIG. 4 illustrates an example of images of a target 100 being captured by a camera 120 at different distances. The camera 120 may include a lens and a sensor configured to capture an image of a scene via the lens. There may or may not be a relay lens used in front of the camera to simulate longer distances.

As shown in FIG. 4, a first image may be captured at a first distance D1. The first distance D1 may correspond to a nominal effective distance of the camera 120 set by the camera and/or application in which the camera will be used.

A second image may be captured at a second distance D2 which is less than distance D1. In one example, distance D2 may be 2.5 to 3 times shorter than the nominal distance D1. For example, if the nominal distance is 15 meters, the camera can be measured at an effective distance of 6 meters.

In one embodiment, the testing may be performed at a longer effective distance. In this example, a third image may be captured at a distance D3 which is larger than the distance D1. In some examples, distance D3 may be 2.5 to 3 times larger than the nominal distance D1.

The images at the different distance D1, D2 and D3 may all be captured under the same environment (e.g., same temperature).

Each of the captured images may be processed to determine MTF values at each of the distances. Based on the MTF values, a determination of the camera performance can be determined. The camera performance may be predicted based on the change in the MTF values captured at different distances.

In some examples, the MTF values determined at only two distances may be sufficient to accurately predict the performance of the camera. In some examples, MTF values determined at more than two distances may be used to determine the performance of the camera.

In some examples, the multiple target distance (e.g., distance D1, D2 and D3) may be based on the target distance specified by the camera's hyperfocal distance (HD) and fractional values thereof. In some examples, the distance D1, D2 or D3 may corresponds to a hyperfocal distance of a camera being tested. In the example with distance D1 corresponding to the hyperfocal distance, distance D2 and other distances that are smaller than D1 may be a fraction of the hyperfocal distance, and distance D3 and other distances that are greater than D1 may be a fraction the hyperfocal distance.

Because ADAS cameras are typically focused at distances greater than the hyperfocal distance (e.g. 5-10 times the hyperfocal distance), the sampling of the hyperfocal distance which yields the largest depth of focus provides an excellent basis by which to sample the focusing field characteristic. In some examples, one set of target distances would be based on the fractional amount of the hyperfocal distance: 0.5 HD, 1.0 HD, 1.5 HD and/or 2.0 HD.

While FIG. 4 illustrates the target being moved to provide the different distances, the target may be stationary and the camera may be moved to provide the different distances between the target and the camera. FIG. 4 illustrates a single image being captured at each distance, but a plurality of images may be captured at each distance and the MTF value at each distance may be determined from the plurality of images to provide an average MTF value for the measured distance.

Figure 5:
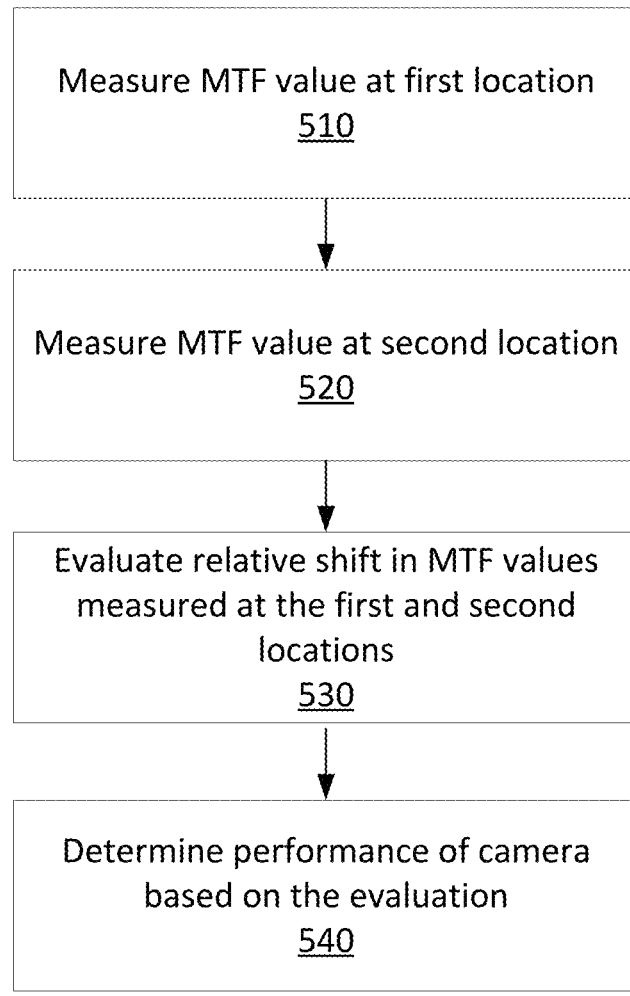
FIG. 5 shows a method for determining performance of a camera according to an embodiment of the present disclosure.

FIG. 5 shows a method for determining performance of a camera according to an embodiment of the present disclosure. In some examples, a processing system including one or more processors and memory may be configured to control an image processing system to perform one or more operations of the method shown in FIG. 5.

In operation 510, MTF value for a camera is determined at a first location. The first location corresponds to a position at which the camera is located a first distance away from a target used for measuring the MTF. In some examples, the first location may correspond to a working distance at which lens of the camera is designed to operate. The MTF value at the first location may be determined from an image captured by the camera at room temperature.

Determining the MTF value at the first location may include receiving a first image including the target and determining the MTF value based on target features extracted from the first image.

In operation 520, MTF value for the camera is determined at a second location. The second location corresponds to a position at which the camera is located a second distance away from the target used for measuring the MTF. In some examples, the second location may be closer to the target than the first location. In other examples, the second location may be farther away from the target than the first location. The first distance may be larger or smaller than the second distance. The MTF value at the second location may be determined from an image captured by the camera at a temperature that is the same as the temperature (e.g., room temperature) used in capturing the image at the first location.

Determining the MTF value at the second location may include receiving a second image including the target and determining the MTF value based on target features extracted from the second image.

In operation 530, a relative shift in the MTF values measured at the first location and the second location is evaluated. The relative shift may be determined for one or more positions on the lens relative to a center of the lens, which may correspond to a center of the image. In some examples, the MTF valued at the axis of the lens may be used in the determination of the relative shift.

In operation 540, the performance of the camera is determined based on the evaluated shift in the MTF value. The shift in the MTF value may predict how the camera will operate at other operating conditions (e.g., other temperatures) and/or over extended period of time.

If the shift in the MTF value exceeds a predetermined limit, the determination may be made that the quality of the camera will degrade more than accepted for a specific application over extended period of time and/or at other temperatures. The predetermined limit may be preset based on the specific application, camera parameters (e.g., focal length, aperture and/or resolution of the camera) and/or MTF values measured at the first and/or second locations. The predetermined limit may be stored in memory or determined dynamically during the testing of the camera.

The first and/or second locations correspond to and/or be based on the hyperfocal distance of the camera.

Determining the performance of the camera may include determining that the system requirements are satisfied based on the measured MTF value at the first location, based on the measured MTF value at the second location and based on the evaluated shift in the MTF value. In some examples, the MTF value at the first location and the MTF value at the second location may both satisfy the requirements for a specific application, but the determined performance of the camera may still not be acceptable for the specific application due to a shift in the MTF value exceeding a preset limit at one or more locations of the lens. The shift exceeding the preset limit may indicate that the camera will not operate as needed under other conditions (e.g., other temperatures).

In some examples, the determination of the performance of the camera may be performed for a single position on the lens relative to the center of the lens, which may correspond to an optical axis, which may correspond to a center of the image. In other examples, the determination of the performance of the camera may be performed for a single position on the lens at a location within the field of view that is displaced radially from the optical axis.

In some examples, the determination of performance may be performed to determine the MTF values over an entire field (e.g., full rectangular field of view) at a minimum of two distances. In some examples, a plurality of images may be captured at each of the distance.

In other examples, the MTF values from a plurality of positions relative to the center of the lens may be used to determine performance of the camera. For example, the MTF values at positions P0, P1 and P3 (shown in FIG. 3) determined at a first distance may be compared to MTF values at positions P0, P1 and P3 determined at a second distance. In this example, the shift in the MTF value may need to be satisfied at each of the positions. In other examples, the shift in the MTF value may need to be satisfied at a predetermined number of positions, without needing to be satisfied at every position.

While a single image is used in operations 510 and 520, in some examples, a plurality of images may be captured at the first location and a plurality of images may be captured at a second location.

The operations of the method described with reference to FIG. 5 may be repeated, sequentially or in parallel using a multi-processor system, for a plurality of different locations of the lens. The camera may be determined to satisfy performance requirements when the test at each of the locations is satisfied.

According to one embodiment of the present technology, the MTF output is evaluated with respect to: (1) the MTF value at the specified distance needs to meet its MTF requirements, (2) the MTF value at the closer distance may need to meet a modified MTF requirement—which may be below the MTF requirement at the specified distance, and (3) the change in MTF between the two distances.

The change in the MTF between the two distances may need to meet predefined conditions in order for the camera to pass the test. In one example, a decrease and/or an increase above a preset limit (e.g., a preset value or a percentage change of the measured value) may indicate a failure of the camera at other operating conditions. In one example, a decrease of more than 15% indicates a potential failure and/or an increase of more than 15% indicates a potential failure. A 15% decrease may indicate a −40° C. failure for a camera and a 15% increase may indicate a +85° C. failure for the camera.

Figure 6:
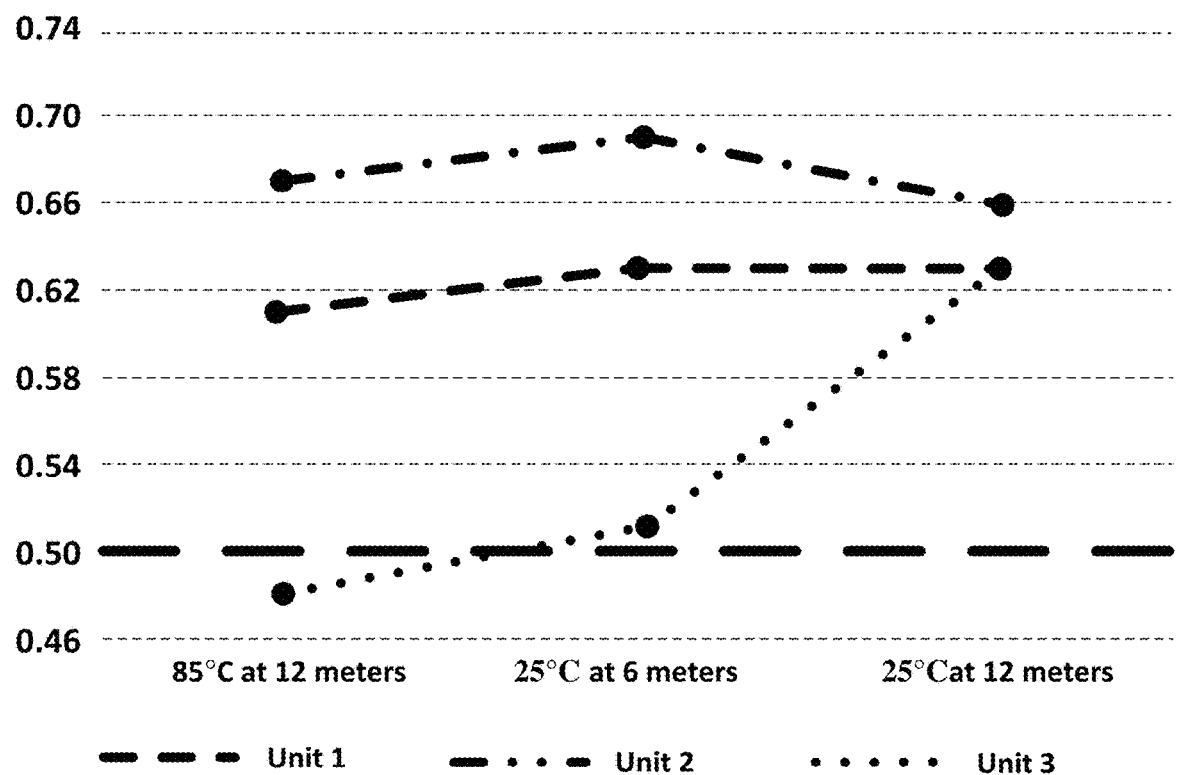
FIG. 6 shows a plot of MTF measurements for different cameras at 25° C. and at 85° C. and at distances of 12 meters and 6 meters.

FIG. 6 shows a plot of MTF measurements for different cameras at 25° C. and at 85° C. and at distances of 12 meters and 6 meters. The graph shows the average readings for 5 positions at 85° C. (12 meters); 25° C. (6 meters) and 25° C. (12 meters).

As shown in FIG. 6, the measurements obtained at 25° C. and at 6 and 12 meters both are above MTF of 0.5 and do not change more than 15% of the measures values (e.g., values at 25° C. and 12 meters). Because the shift in the values does not exceed 15%, it can be predicted that the camera will provide acceptable MTF value at other temperatures. This is supported by FIG. 6 showing that at 85° C. and at distance of 12 meters, the MTF values for cameras 1 and 2 are above MTF of 0.5.

The MTF values of camera 3 at 25° C. and at 6 and 12 meters are also above MTF of 0.5. However, the shift in the MTF value between measurements at 25° C. and at 6 and 12 meters shifts more than 15%. Because the shift (which is approximately 20%) in the values exceeds 15%, it can be predicted that the camera will not provide acceptable MTF value at other temperatures. This is supported by FIG. 6 showing that at 85° C. and at distance of 12 meters, the MTF values for camera 3 is below MTF of 0.5. As shown in FIG. 6, camera 3 MTF value at 25° C. and 12 meters is the same as camera 1, but fails the test at 85° C. The performance of camera 3 at 25° C. and 6 meters is similar to performance at 85° C.

Therefore, by measuring at room temperature and different distances the performance at other temperatures can be inferred. This shift in MTF further informs the long-term stability of the camera. Thus, predictions of camera performance can be made for other temperature without needing to test the camera at other temperatures. The benefit of this approach is that it simply requires moving the target image location (or preferably employing two separate target sets and evaluating the MTF. Parts that fail the evaluation can be contained for further testing or rejected without further evaluation.

Although not shown in FIG. 6, if there was a significant increase in the MTF value from 12 meters to 6 meters, this would indicate a different potential failure mode of the camera.

Figure 7:
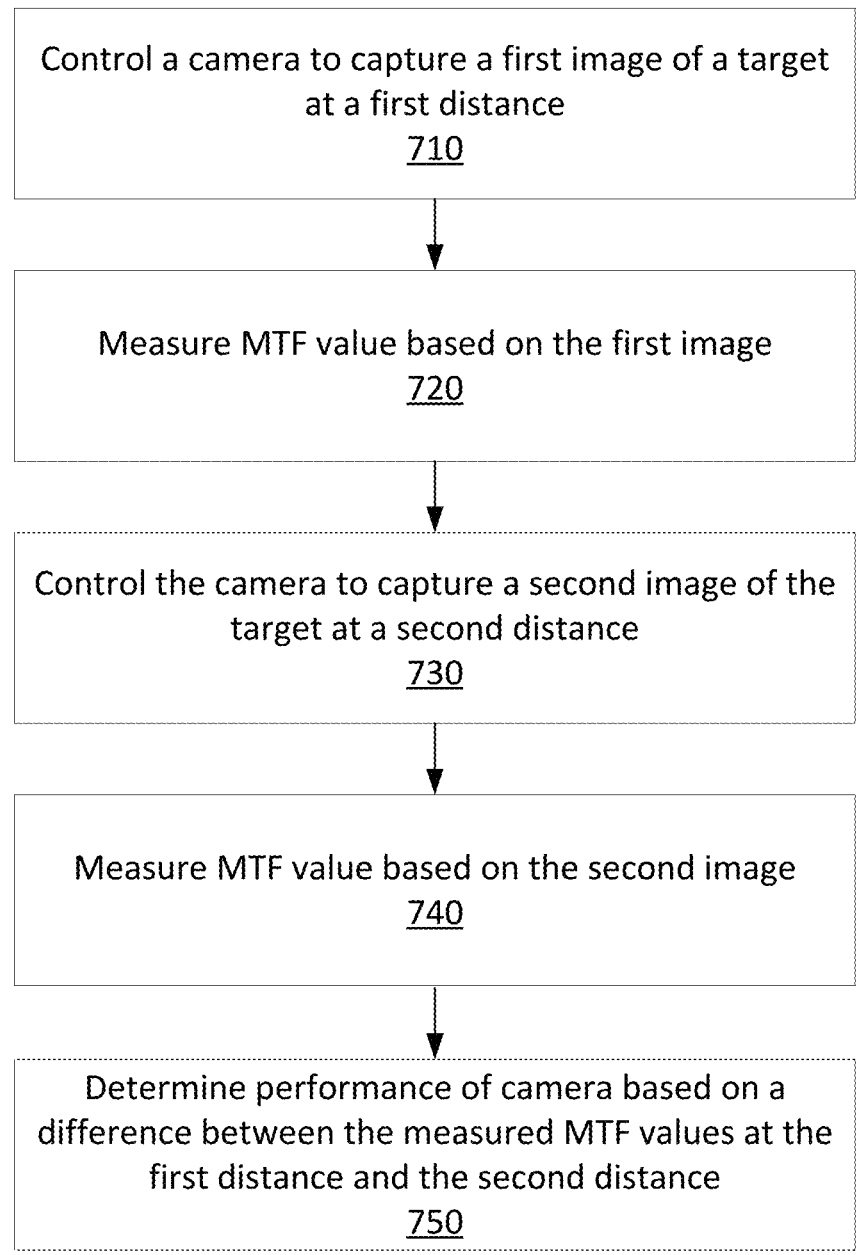
FIG. 7 shows a method for determining performance of a camera according to another embodiment of the present disclosure.

FIG. 7 shows a method for determining performance of a camera according to another embodiment of the present disclosure. In some examples, a processing system including one or more processors and memory may be configured to control an image processing system to perform one or more operations of the method shown in FIG. 7. The discussion of the operations performed with reference to FIG. 5 may be applied to the operations discussed with reference to FIG. 7.

In operation 710, a camera is controlled to capture a first image of a target at a first distance from a target. The first distance may correspond to a nominal distance of the camera at which the camera is expected to operate for a specific application.

In operation 720, the MTF value may be determined for the camera based on the captured first image. The MTF value may be determined at one or more positions on the lens relative to a central axis of the lens.

In operation 730, the camera is controlled to capture a second image of a target at a second distance from a target. The second distance may be different from the first distance. In some examples, the method may include controlling a system to move the camera and/or the target so that the second distance is provided between the camera and the target. The camera and the target may be disposed on a platform with the distance between the camera and the target controllable based on a signal received from the processing system.

In operation 740, the MTF value may be determined for the camera based on the captured second image. The MTF value may be determined at the one or more positions on the lens relative to the central axis of the lens.

In operation 750, performance of the camera is determined. The performance of the camera may be determined based on the MTF value determined from the first image, the MTF value determined from the second image and a difference in the MTF values determined at the first and second distances. In some examples, the determination of camera performance may include providing an indication as to whether the camera passed or failed the test.

In other examples, the determination of camera performance may include providing a value indicating how close the performance of the camera is to acceptable values. For example, the results of the test may indicate a percentage in the shift of the MTF value.

An output may be provided based on the results of the test. For example, the results of the test may be displayed on a display coupled to the processing system.

While the above disclosure is discussed with reference to determining performance of a camera at different temperatures using MTF results at different distances, embodiments of the disclosure may be applied to determining performance of the camera in other varied environments that can be correlated to MTF measurements. For example, the MTF measurements can be correlated to how the camera is assembled (e.g., torque applied in assembly of the camera), operation of camera with varied humidity, and/or air pressure.

Examples of embodiments may also be applied to testing a lens of a camera system.

Examples embodiments provide for a simple (or elegant) way to determine camera performance without testing at high temperature and can be automated within the manufacturing environment.

While the examples of the present technology are described with reference to a vehicle, they are not so limited and may be applied to other camera systems installed in other locations. For example, examples of the present technology may be applicable to cameras installed in aerial vehicles (e.g., drones, planes, autonomous planes), robots, inside or outside of buildings, walls, and traffic lights.

Figure 8:
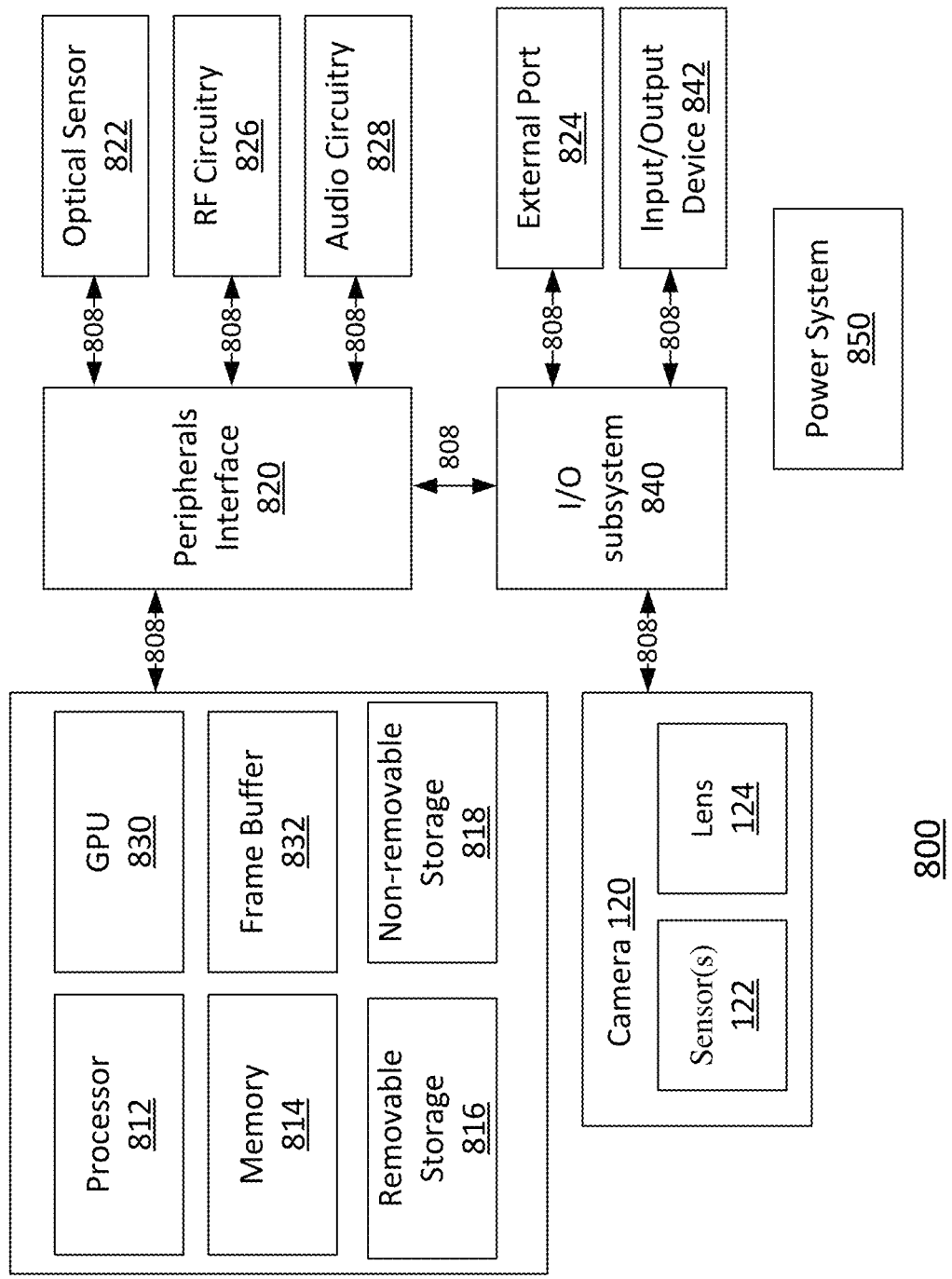
FIG. 8 illustrates an exemplary processing system upon which various embodiments of the present disclosure(s) may be implemented.

FIG. 8 illustrates an exemplary system 800 upon which embodiments of the present disclosure(s) may be implemented. For example, the system 800 may perform one or more of the operations described with reference to FIGS. 5 and/or 7. The system 800 may be a portable electronic device that is commonly housed, but is not so limited.

The various components in the system 800 may be coupled to each other and/or to a processing system by one or more communication buses or signal lines 808.

A camera 120 including a sensor 122 (e.g., a CMOS or CCD image sensor) and a lens 124 (which may be a fixed aperture lens and/or a fixed focus lens) may be coupled to a processing system including one or more processors 812 and memory 814. The one or more processors 812 may control the camera to capture images of a target at different distances from the target and determine performance of the camera based on the captured images.

The processor 812 may comprise a central processing unit (CPU) or other type of processor. Depending on the configuration and/or type of computer system environment, the memory 814 may comprise volatile memory (e.g., RAM), non-volatile memory (e.g., ROM, flash memory, etc.), or some combination of the two. Additionally, memory 814 may be removable, non-removable, etc.

In other embodiments, the processing system may comprise additional storage (e.g., removable storage 816, non-removable storage 818, etc.). Removable storage 816 and/or non-removable storage 818 may comprise volatile memory, non-volatile memory, or any combination thereof. Additionally, removable storage 816 and/or non-removable storage 818 may comprise CD-ROM, digital versatile disks (DVD) or other optical storage, magnetic cassettes, magnetic tape, magnetic disk storage or other magnetic storage devices, or any other medium which can be used to store information for access by processing system.

As illustrated in FIG. 8, the processing system may communicate with other systems, components, or devices via peripherals interface 820. Peripherals interface 820 may communicate with an optical sensor 822, external port 824, RC circuitry 826, audio circuitry 828 and/or other devices. The optical sensor 822 may be a CMOS or CCD image sensor. The RC circuitry 826 may be coupled to an antenna and allow communication with other devices, computers and/or servers using wireless and/or wired networks. The system 800 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), BLUETOOTH (BLUETOOTH is a registered trademark of Bluetooth Sig, Inc.), Wi-MAX, a protocol for email, instant messaging, and/or a short message service (SMS), or any other suitable communication protocol, including communication protocols not yet developed as of the filing date of this document. In an exemplary embodiment, the system 800 may be, at least in part, a mobile phone (e.g., a cellular telephone) or a tablet.

A graphics processor 830 may perform graphics/image processing operations on data stored in a frame buffer 832 or another memory of the processing system. Data stored in frame buffer 832 may be accessed, processed, and/or modified by components (e.g., graphics processor 830, processor 812, etc.) of the processing system and/or components of other systems/devices. Additionally, the data may be accessed (e.g., by graphics processor 830) and displayed on an output device coupled to the processing system. Accordingly, memory 814, removable storage 816, non-removable storage 818, frame buffer 832, or a combination thereof, may comprise instructions that when executed on a processor (e.g., 812, 830, etc.) implement a method of processing data (e.g., stored in frame buffer 832) for improved display quality on a display.

The memory 814 may include one or more applications. Examples of applications that may be stored in memory 814 include, navigation applications, telephone applications, email applications, text messaging or instant messaging applications, memo pad applications, address books or contact lists, calendars, picture taking and management applications, and music playing and management applications. The applications may include a web browser for rendering pages written in the Hypertext Markup Language (HTML), Wireless Markup Language (WML), or other languages suitable for composing webpages or other online content. The applications may include a program for browsing files stored in memory.

The memory 814 may include a contact point module (or a set of instructions), a closest link module (or a set of instructions), and a link information module (or a set of instructions). The contact point module may determine the centroid or some other reference point in a contact area formed by contact on the touch screen. The closest link module may determine a link that satisfies one or more predefined criteria with respect to a point in a contact area as determined by the contact point module. The link information module may retrieve and display information associated with selected content.

Each of the above identified modules and applications may correspond to a set of instructions for performing one or more functions described above. These modules (i.e., sets of instructions) need not be implemented as separate software programs, procedures or modules. The various modules and sub-modules may be rearranged and/or combined. Memory 814 may include additional modules and/or sub-modules, or fewer modules and/or sub-modules. Memory 814, therefore, may include a subset or a superset of the above identified modules and/or sub-modules. Various functions of the system may be implemented in hardware and/or in software, including in one or more signal processing and/or application specific integrated circuits.

Memory 814 may store an operating system, such as Darwin, RTXC, LINUX, UNIX, OS X, WINDOWS, or an embedded operating system such as VxWorks. The operating system may include procedures (or sets of instructions) for handling basic system services and for performing hardware dependent tasks. Memory 814 may also store communication procedures (or sets of instructions) in a communication module. The communication procedures may be used for communicating with one or more additional devices, one or more computers and/or one or more servers. The memory 814 may include a display module (or a set of instructions), a contact/motion module (or a set of instructions) to determine one or more points of contact and/or their movement, and a graphics module (or a set of instructions). The graphics module may support widgets, that is, modules or applications with embedded graphics. The widgets may be implemented using JavaScript, HTML, Adobe Flash, or other suitable computer program languages and technologies.

An I/O subsystem 840 may include an imaging sensor controller, a lens controller and/or other input/output controller(s). The other input/output controller(s) may be coupled to other input/control devices 842, such as one or more buttons. In some alternative embodiments, input controller(s) may be coupled to any (or none) of the following: a keyboard, infrared port, USB port, and/or a pointer device such as a mouse. The one or more buttons (not shown) may include an up/down button for volume control of the speaker and/or the microphone. The one or more buttons (not shown) may include a push button. The user may be able to customize a functionality of one or more of the buttons. The touch screen may be used to implement virtual or soft buttons and/or one or more keyboards.

In some embodiments, the system 800 may include circuitry for supporting a location determining capability, such as that provided by the Global Positioning System (GPS). The system 800 may include a power system 850 for powering the various components. The power system 850 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The system 800 may also include one or more external ports 824 for connecting the system 800 to other devices.

Portions of the present invention may be comprised of computer-readable and computer-executable instructions that reside, for example, in a processing system and which may be used as a part of a general purpose computer network (not shown). It is appreciated that processing system is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

Embodiments of the subject matter and the functional operations described herein can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory storage medium for execution by, or to control the operation of, data processing apparatus (i.e., one or more computer programs). The computer storage medium can be one or more of: a machine-readable storage device, a machine-readable storage substrate, a random or serial access memory device, and combinations thereof.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this application.

The invention claimed is:

1. A camera testing system for determining performance of a camera including an imaging sensor and a lens including one or more lens elements, the camera testing system comprising:
a processing system comprising at least one processor and memory, the processing system configured to:
control the camera to capture, using the imaging sensor, a first image through the lens of a target disposed at a first distance from the camera, the target including a plurality of features comprising vertical and horizontal slanted edges;
determine a first modulation transfer function (MTF) value from the first image including the plurality of features;
control the camera to capture, using the imaging sensor, a second image through the lens of the target disposed at a second distance from the camera that is different from the first distance;
determine a second MTF value from the second image including the plurality of features; and
determine performance of the camera based on the first MTF value, the second MTF value and a difference between the first MTF value and the second MTF value, wherein the determining performance of the camera includes determining that the camera passes a performance test when the first MTF value is above a first preset value, the second MTF value is above a second preset value, and the difference between the first MTF value and the second MTF value is below a third preset value or below a preset percentage of the first MTF value.

2. The camera testing system of claim 1, wherein the processing system is further configured to determine a relative MTF shift between the first MTF value and the second MTF value, and the performance of the camera is determined based on the relative MTF shift.

3. The camera testing system of claim 1, wherein the first and second MTF values are determined at a plurality of locations over a field of view of the lens.

4. The camera testing system of claim 1, wherein the camera is controlled to capture the first and second images at a same room temperature.

5. The camera testing system of claim 1, wherein the camera is controlled to capture the first and second images at a first temperature and the performance of the camera at another temperate is determined based on the difference between the first MTF value and the second MTF value.

6. The camera testing system of claim 1, wherein the second distance is 2.5 to 3 times shorter than the first distance.

7. The camera testing system of claim 1, wherein the first distance and/or the second distance are a fractional value of a hyperfocal distance of the camera.

8. The camera testing system of claim 1, wherein the processing system is further configured to:
control the camera to capture, using the imaging sensor, a third image through the lens of the target disposed at a third distance from the camera that is different from the first and second distances;
determine a third MTF value from the third image including the plurality of features; and
determine performance of the camera based on the first MTF value, the second MTF value, the third MTF value and a shift in MTF value between the first MTF value, the second MTF value and the third MTF value.

9. The camera testing system of claim 1, wherein the determining performance of the camera includes determining that the camera fails a performance test when the second MTF value increases or decreases from the first MTF value by a preset percentage.

10. The camera testing system of claim 1, wherein the first distance is an operating distance of the camera for an application for which the camera is being tested.

11. A method for testing performance of a camera, the method comprising:
control the camera to capture a first image of a target disposed at a first distance from the camera, the target including a plurality of features comprising vertical and horizontal slanted edges;
control the camera to capture a second image of the target disposed at a second distance from the camera that is different from the first distance;
measure a first modulation transfer function (MTF) value of the camera from the first image including the plurality of features;
measure a second MTF value of the camera from the second image including the plurality of features; and
determine performance of the camera being satisfactory if the first MTF value is above a first preset value, the second MTF value is above a second preset value and a difference between the first MTF value and the second MTF value is less than a third value or below a preset percentage of the first MTF value.

12. The method of claim 11, wherein the first distance is a nominal effective distance of the camera and the second distance is 2.5 to 3 times shorter than the first distance.

13. The method of claim 11, wherein the second preset value is lower than the first preset value and the third value is 15% of the first MTF value.

14. A method for testing performance of a camera including an imaging sensor and a lens including one or more lens elements, the method comprising:
controlling the camera to capture, using the imaging sensor, a first image through the lens of a target disposed at a first distance from the camera, the target including a plurality of features comprising vertical and horizontal slanted edges;
determining a first modulation transfer function (MTF) value from the first image including the plurality of features;
controlling the camera to capture, using the imaging sensor, a second image through the lens of the target disposed at a second distance from the camera that is different from the first distance;
determining a second MTF value from the second image including the plurality of features; and
determining performance of the camera based on the first MTF value, the second MTF value and a difference between the first MTF value and the second MTF value, wherein the determining performance of the camera includes determining that the camera passes a performance test when the first MTF value is above a first preset value, the second MTF value is above a second preset value, and the difference between the first MTF value and the second MTF value is below a third preset value or below a preset percentage of the first MTF value.

15. The method of claim 14, wherein the first and second MTF values are determined at an optical axis of the lens and the camera is controlled to capture the first and second images at a same room temperature.

16. The method of claim 14, wherein the first distance is a nominal effective distance of the camera and the second distance is 2.5 to 3 times shorter than the first distance.

17. A computer-readable non-transitory storage medium having stored therein a program to be executed by a computer of a camera testing system for determining performance of a camera comprising an imaging sensor and a lens including one or more lens elements, the program, when executed, causing the computer to control the camera testing system to at least:

control the camera to capture, using the imaging sensor, a first image through the lens of a target disposed at a first distance from the camera, the target including a plurality of features comprising vertical and horizontal slanted edges;

determine a first modulation transfer function (MTF) value from the first image including the plurality of features;

control the camera to capture, using the imaging sensor, a second image through the lens of the target disposed at a second distance from the camera that is different from the first distance;

determine a second MTF value from the second image including the plurality of features; and determine performance of the camera based on the first MTF value, the second MTF value and a difference between the first MTF value and the second MTF value, wherein the determining performance of the camera includes determining that the camera passes a performance test when the first MTF value is above a first preset value, the second MTF value is above a second preset value, and the difference between the first MTF value and the second MTF value is below a third preset value or below a preset percentage of the first MTF value.

* * * * *